US012066123B2

(12) United States Patent
Acquart

(10) Patent No.: US 12,066,123 B2
(45) Date of Patent: Aug. 20, 2024

(54) INTEGRATING FLUID PATHWAYS INTO A VALVE SUPERSTRUCTURE

(71) Applicant: Dresser, LLC, Houston, TX (US)

(72) Inventor: Arnaud Tony Acquart, Gouvix (FR)

(73) Assignee: Dresser, LLC, Houston, TX (US)

( * ) Notice: Subject to any disclaimer, the term of this patent is extended or adjusted under 35 U.S.C. 154(b) by 0 days.

(21) Appl. No.: 17/899,795

(22) Filed: Aug. 31, 2022

(65) Prior Publication Data

US 2024/0068591 A1 Feb. 29, 2024

(51) Int. Cl.
*F16K 31/363* (2006.01)
*B33Y 80/00* (2015.01)
*F16K 27/02* (2006.01)

(52) U.S. Cl.
CPC ............ *F16K 31/363* (2013.01); *F16K 27/02* (2013.01); *B33Y 80/00* (2014.12)

(58) Field of Classification Search
CPC ...... F16K 31/363; F16K 31/365; F16K 31/36; F16K 27/02; F16K 27/08; F16K 27/00
USPC .... 251/61, 61.1, 61.2, 61.3, 61.4, 61.5, 61.6
See application file for complete search history.

(56) References Cited

U.S. PATENT DOCUMENTS

| | | | | |
|---|---|---|---|---|
| 2,110,859 A * | 3/1938 | Goehring | ............ | F16K 31/1262 251/355 |
| 2,882,008 A * | 4/1959 | Giauque | ............... | F16K 31/126 251/145 |
| 4,922,952 A * | 5/1990 | Kemmler | .............. | F16K 31/126 91/387 |
| 5,288,052 A * | 2/1994 | Black | .................. | F16K 31/1262 251/30.01 |
| 5,469,774 A * | 11/1995 | Kaspers | ................ | F16K 31/165 92/110 |
| 5,516,079 A * | 5/1996 | Baumann | ............... | F16K 31/126 137/625.3 |
| 5,699,664 A * | 12/1997 | LaFleur | .................... | F01N 3/22 251/61.4 |
| 10,337,639 B2 * | 7/2019 | Jackson | .............. | F16K 31/1264 |
| 2004/0155210 A1 * | 8/2004 | Wears | ..................... | F16K 31/12 251/12 |
| 2014/0014859 A1 * | 1/2014 | McCarty | ............... | F16K 31/126 251/61.4 |
| 2015/0159772 A1 * | 6/2015 | Kullen | ................ | F16K 37/0016 251/61.5 |
| 2015/0233489 A1 * | 8/2015 | Gossett | .............. | F16K 31/1262 251/83 |
| 2015/0240965 A1 | 8/2015 | Arnold et al. | | |
| 2018/0119586 A1 | 5/2018 | Bock et al. | | |
| 2018/0238209 A1 * | 8/2018 | Suzuki | .................... | F01N 13/18 |

OTHER PUBLICATIONS

Baker Hughes, "Masoneilan 21000 Series Top Guided Globe Valve with Lo-dB/Anti-cavitation capabilities," (2020).

* cited by examiner

*Primary Examiner* — Daphne M Barry
(74) *Attorney, Agent, or Firm* — Paul Frank + Collins P.C.

(57) ABSTRACT

A superstructure is configured for use on a flow control, like a control valve. These configurations may have internal plumbing to carry fluid between parts of the valve. In one implementation, the plumbing connects a controller with an actuator to allow a pneumatic signal from the controller to pressurize the actuator. The internal plumbing forgoes the need for external pipes or tubes. This feature can simplify the assembly, as well as reduce the overall package size of the valve to avoid potential fit or interference issues at its location on a process line.

20 Claims, 5 Drawing Sheets

INTEGRATING FLUID PATHWAYS INTO A VALVE SUPERSTRUCTURE

BACKGROUND

Flow controls play a large role in many industrial facilities. Power plants and industrial process facilities, for example, use different types of flow controls to manage flow of a material, typically fluids, throughout vast networks of pipes, tanks, generators, and other equipment. Valves, some known as "control valves," are a type of flow control that provide active control of flow of material in a process line. These devices often embody an assembly of several parts onto a main "superstructure." On one hand, this multi-part design is useful because it provides operators with accurate, stable flow of material across their process line. But on the other hand certain geometry or physical attributes of the parts may complicate manufacture or assembly, increase costs of ownership, or, in some cases, frustrate line layout because of fit or interference issues found onsite.

SUMMARY

The subject matter of this disclosure relates to improvements to structure of flow controls. Of particular interest are embodiments with a superstructure that integrates certain features therein. Use of this superstructure design will allow for assembly of flow controls with less parts. This feature results in a more compact design with a smaller footprint, thus making the package less obtrusive and more amendable to smaller install spaces or "envelopes" on the process line.

DRAWINGS

Reference is now made briefly to the accompanying drawings, in which.

Figure 1:
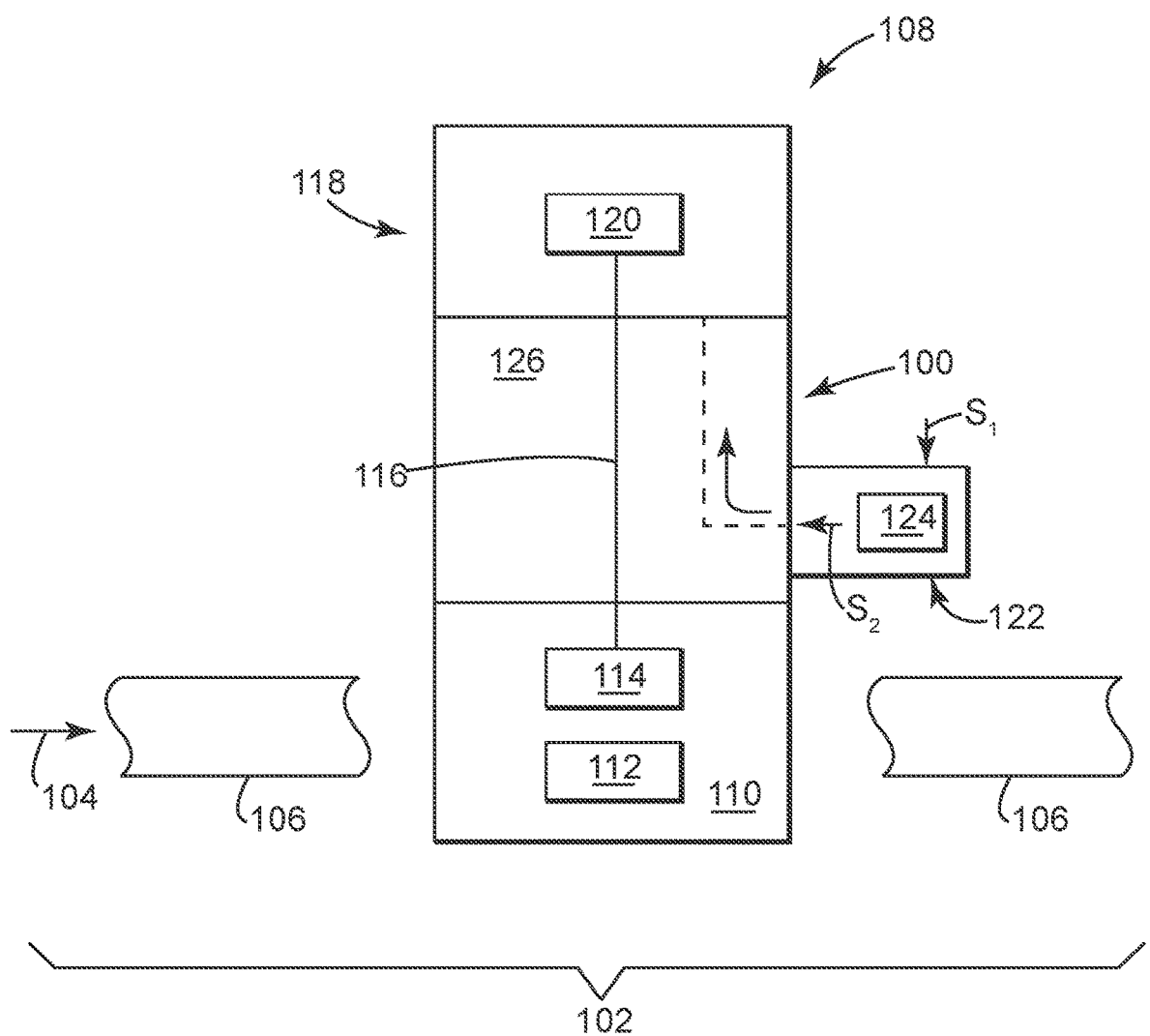
FIG. 1 depicts a schematic diagram of an exemplary embodiment of a superstructure.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

The drawings and any description herein use examples to disclose the invention. These examples include the best mode and enable any person skilled in the art to practice the invention, including making and using any devices or systems and performing any incorporated methods. An element or function recited in the singular and proceeded with the word "a" or "an" should be understood as not excluding plural of said elements or functions, unless such exclusion is explicitly recited. References to "one embodiment" or "one implementation" should not be interpreted as excluding the existence of additional embodiments or implementations that also incorporate the recited features.

DESCRIPTION

The discussion now turns to describe features of the embodiments shown in drawings noted above. These features may rely on advanced manufacturing techniques, like additive or "3-D" manufacturing technology. Use of these techniques allow for complex geometry that might not readily comport with more standard, subtractive (or machining) operations. The designs herein, for example, may provide superstructure with plumbing or passages that can carry flow of fluid under sustained pressure. In turn, this feature may forego the need for external pipes or conduit that might expand the working envelope of the flow control beyond operator specifications. Other embodiments are contemplated within the scope and spirit of this disclosure.

FIG. 1 depicts a schematic diagram for an example of a superstructure 100. This example is found in a distribution network 102, typically designed to carry material 104 through a network of conduit 106. The superstructure 100 may be part of a flow control 108 that has a valve sub-assembly 110 to connect in-line with the conduit 106. The valve sub-assembly 110 may house a seat 112 and a closure member 114, which can move to positions relative to the seat 112 to regulate flow of material 104. A valve stem 116 may connect the closure member 114 with an actuator 118 that includes a piston assembly 120. A controller 122 may have operating hardware 124 that connects with plant instrument air supply (or "instrument air") and can converts an incoming electronic control signal $S_1$ (for example, a 4-20 mA signal,) into an actuator control signal $S_2$ that pressurizes the actuator 118. In one implementation, the superstructure 100 may include a yoke 126 with features to direct the actuator control signal $S_2$ to pressurize the actuator 118.

Broadly, the superstructure 100 may be configured to support other parts of the underlying valve assembly. These configurations may provide a stable platform for both a flow control device (e.g., a valve) and an actuating mechanism (e.g., a pneumatic actuator). This platform typically requires a robust design that is strong enough to withstand forces, moments, torque, or vibration consistent with industrial applications. As noted herein, the platform design may include integral features, like flow passages, that allow air or fluids to transit from or between different parts of the assembly. Favorably, this feature can reduce the size of the device because it eliminates the need for piping that resides external to the superstructure. The smaller size can fit into "tighter" spaces than conventional devices that use the external pipe networks.

The distribution system 102 may be configured to deliver or move resources. These configurations may embody vast infrastructure. Material 104 may comprise gases, liquids, solids, or mixes, as well. The conduit 106 may include pipes or pipelines, often that connect to pumps, boilers, and the like. The pipes may also connect to tanks or reservoirs. In many facilities, this equipment forms complex networks.

The flow control 108 may be configured to regulate flow of material 104 through the conduit 106 in these complex networks. These configurations may include control valves and like devices. The valve sub-assembly 110 in such devices is often made of cast or machined forgings. The structure may form a flange at the openings I, O. Adjacent pipes 106 may connect to these flanges to allow material 104 to flow through the device, for example, through an opening in the seat 112. The closure member 114 may embody a metal disc or metal "plug." The valve stem 116 may embody an elongate cylinder or rod that connects on one end to this plug. The other end of this rod may couple with the actuator 118. Often, the piston assembly 120 in the actuator 118 may include a piston and a spring that together generate a load on the valve stem 116. This load regulates the position of the plug 114, which in turn manages flow of material 104 through the seat 112 and into the pipes 106 downstream of the device.

The controller 122 may be configured to process and generate signals. These configurations may connect to a control network (or "distributed control system" or "DCS"), which maintains operation of all devices on process lines to ensure that materials flow in accordance with a process. The DCS may generate control signals with operating parameters, including "setpoint," that describe or define operation of the control valve 108 for this purpose. The operating hardware 124 may employ electrical and computing components (e.g., processors, memory, executable instructions, etc.). These components may also include electro-pneumatic devices that operate on incoming electronic signal $S_1$. These components ensure that the outgoing actuator control signal $S_2$ to the actuator 118 is appropriate for the control valve 108 to supply material 104 downstream according to process parameters.

The yoke 126 may be configured to carry the control signal $S_2$. These configurations may incorporate the internal or integral flow passages that may reside within the material structure of the device. These internal flow passages can connect the actuator 118 and the controller 122. In this way, flow between these devices can occur without the need for any external tubes that might frustrate use or operation of the flow control 108 in its location on a process line.

Figure 2:
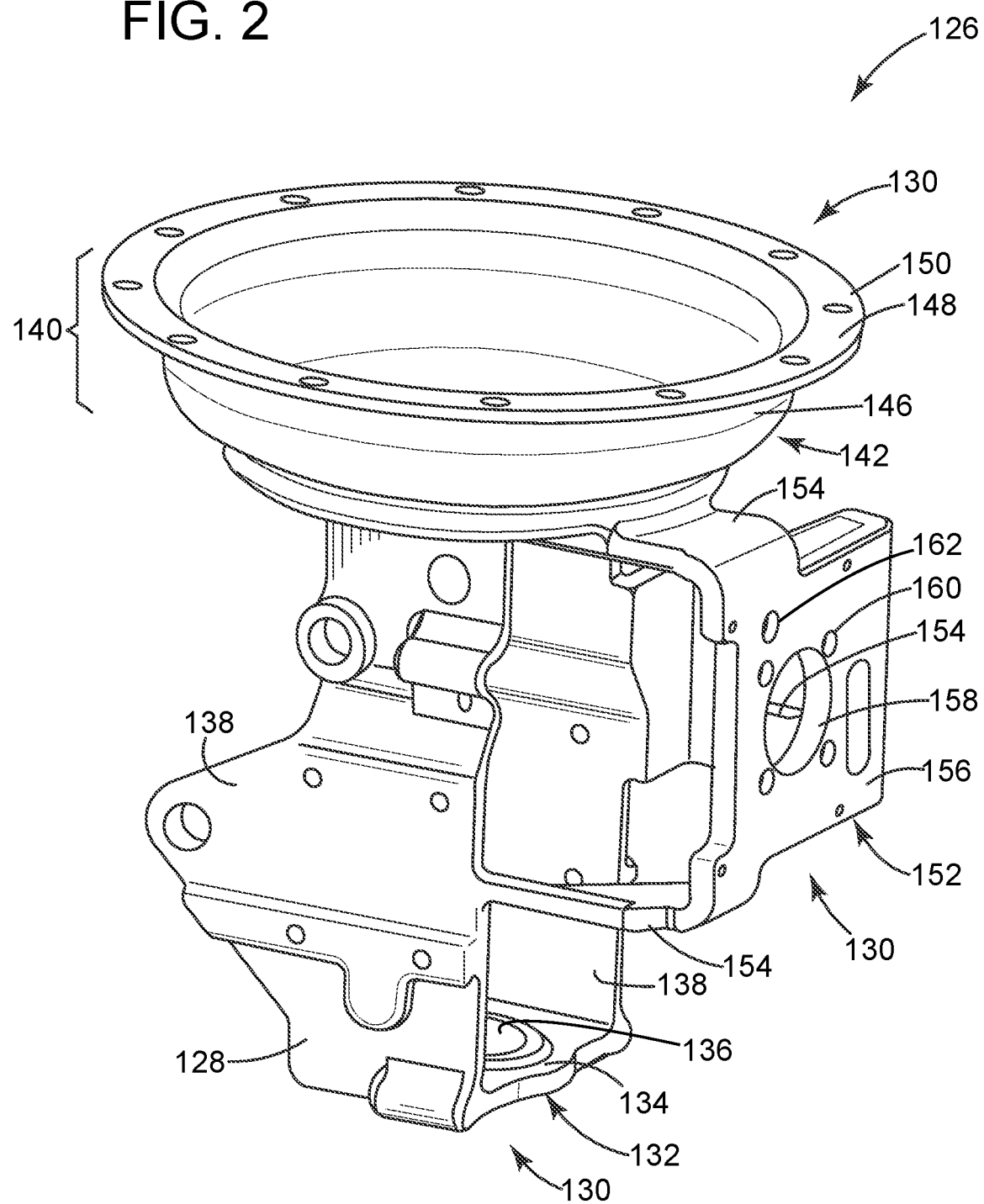
FIG. 2 depicts a perspective view of exemplary structure of the superstructure of FIG. 1.

FIG. 2 depicts a perspective view of an example of the yoke 126. This example may include a hardened structure 128 made of materials like metals or composites, as desired. The materials may exhibit properties robust enough to survive caustic materials or harsh environments that are synonymous with hydrocarbon industries. It may also benefit the design for these materials to comport with additive manufacturing techniques because these techniques are useful to provide certain features of this design to occur in its integrated, unitary form. As shown, the hardened structure 128 may have ends 130 that are arranged to receive different parts of the flow control 108 for final assembly of the device. The ends 130 may include a valve mount 132 that features a generally planar interface plate 134 with a central aperture 136. The plate 134 may receive part of the valve sub-assembly 110. This part, sometimes called the "bonnet," can provide threaded locations to receive fasteners (like bolts) that penetrate through the plate 134. Tightening these fasteners will secure the valve sub-assembly 110 to the yoke 126. The central aperture 136 may permit the valve stem 116 to extend through the plate 134. A pair of uprights 138 may reside on either side of the valve stem 116. The uprights 138 may have a first end that couples with the interface plate 134. A second end may secure to an actuator mount 140. In one implementation, the actuator mount 140 may form a first part of the actuator 118. This first part may embody a lower casing 142 that couples with the second end of the uprights 138. The lower casing 142 may have a peripheral wall 146 that circumscribes a center axis A. The wall 146 may terminate at a flanged outer edge 148 with openings 150 disposed therein. The peripheral wall 146 may form a round, bowl-like member; however, other geometry may prevail as well. Openings 150 may reside in the flanged outer edge 148, preferably being uniformly spaced from one another about its circumference. As also shown, the yoke 126 may include a control mount 152 with arms 154 that extend outwardly, and generally horizontally, from the uprights 138. The arms 154 may terminate at an interface plate 156 with a large opening 158. Mounting holes 160 may reside in proximity to the opening 158. The holes 160 may find use to receive fasteners that attach the controller 122 to the interface plate 156. A port 162 may also penetrate through the plate 156. The port 162 may align with a corresponding outlet on the controller 122.

Figure 3:
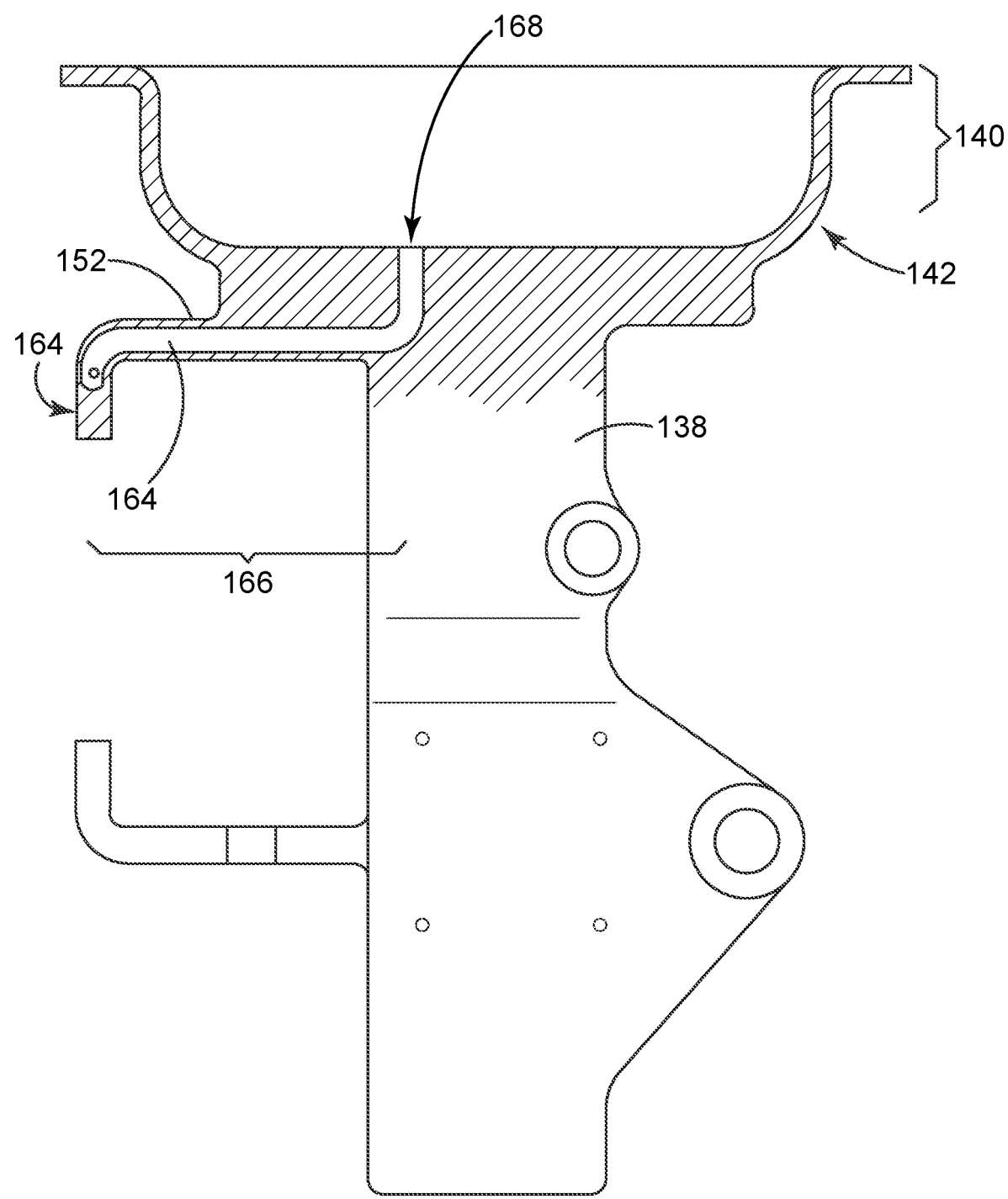
FIG. 3 depicts an elevation view of the cross-section from the side of the superstructure of FIG. 2.

FIG. 3 depicts an elevation view of the cross-section of the side of the yoke 126 of FIG. 2. The port 162 may form an inlet to a flow passage 164. In one implementation, the flow passage 164 may form a bore 166 inside of the yoke 126, including in the uprights 138 or the arms 152. The bore 166 operates as a conduit to carry fluid, like air. It may have a generally contiguous internal surface that prevents leaks. Additive manufacturing techniques may prove critical to establish this type of integrated geometry. As also shown, the bore 166 may terminate at a port 168, shown here to reside within the boundary of the peripheral wall 146. The port 168 may form an outlet to the flow passage 164. This feature will allow air to flow into the interior of the bowl-like member.

Figure 4:
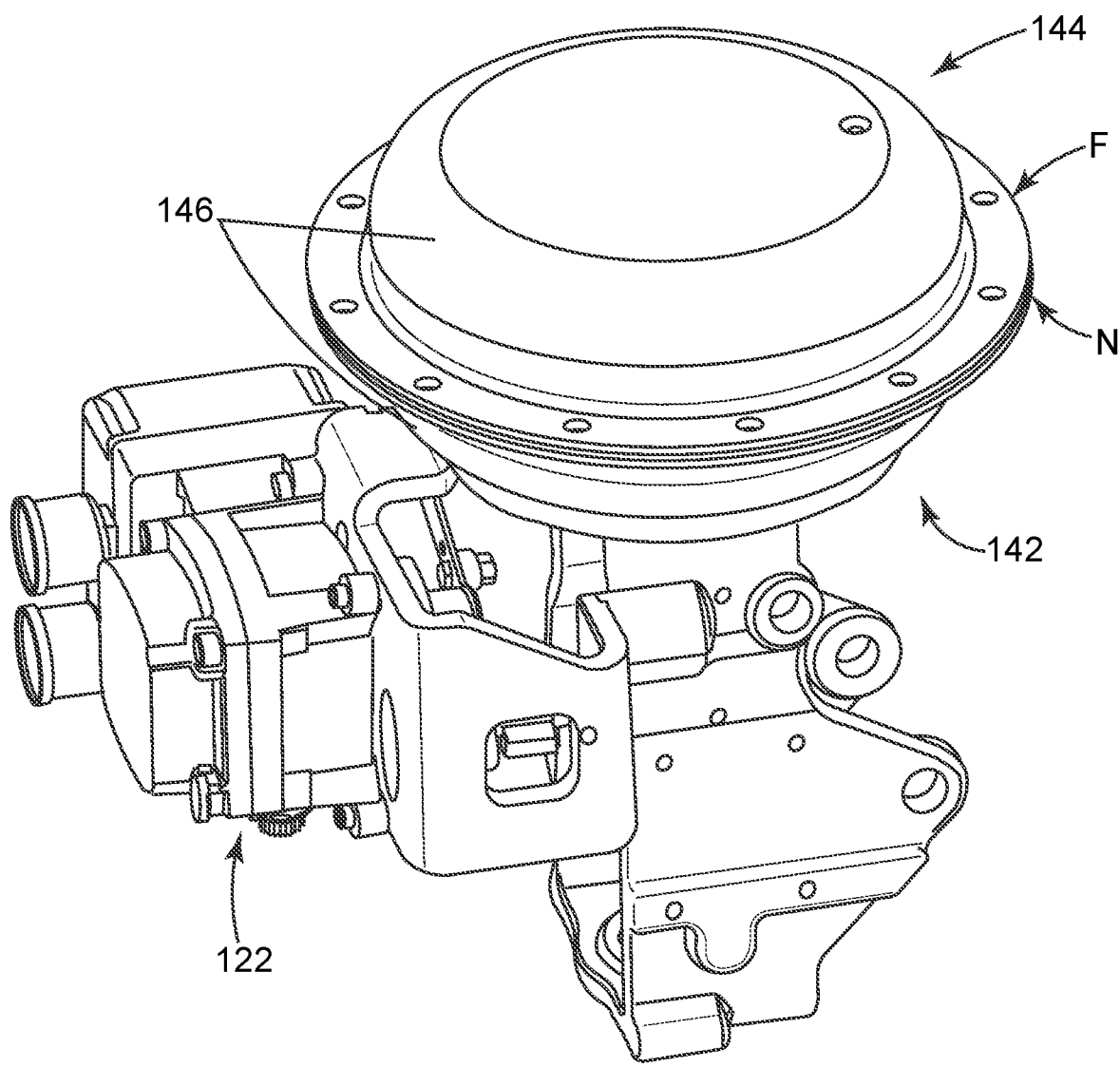
FIG. 4 depicts a perspective view of an example of a flow control, in partially-assembled form.

FIG. 4 depicts a perspective view of the yoke 126 as part of an example of a flow control 108. This example has an upper casing 144 that attaches to the lower casing 142. The upper casing 144 may adopt the bowl-like member geometry, noted above, with the peripheral wall 146 that has the flange 148 with openings 150 as well. The openings 150 in both members 142, 144 may receive fasteners. For example, nuts and bolts may find use to tighten the flange 148 of the bowl-like members 146 together to form a sealed, air-tight enclosure. The controller 122 can secure to its mount 152 to align its "outlet" with the inlet 162 to the flow passage 164. This feature permits outgoing actuator control signal $S_2$ to transit the flow passage 166 to the outlet 168 in the lower member 142. This signal pressurizes the sealed enclosure of the actuator 118.

Figure 5:
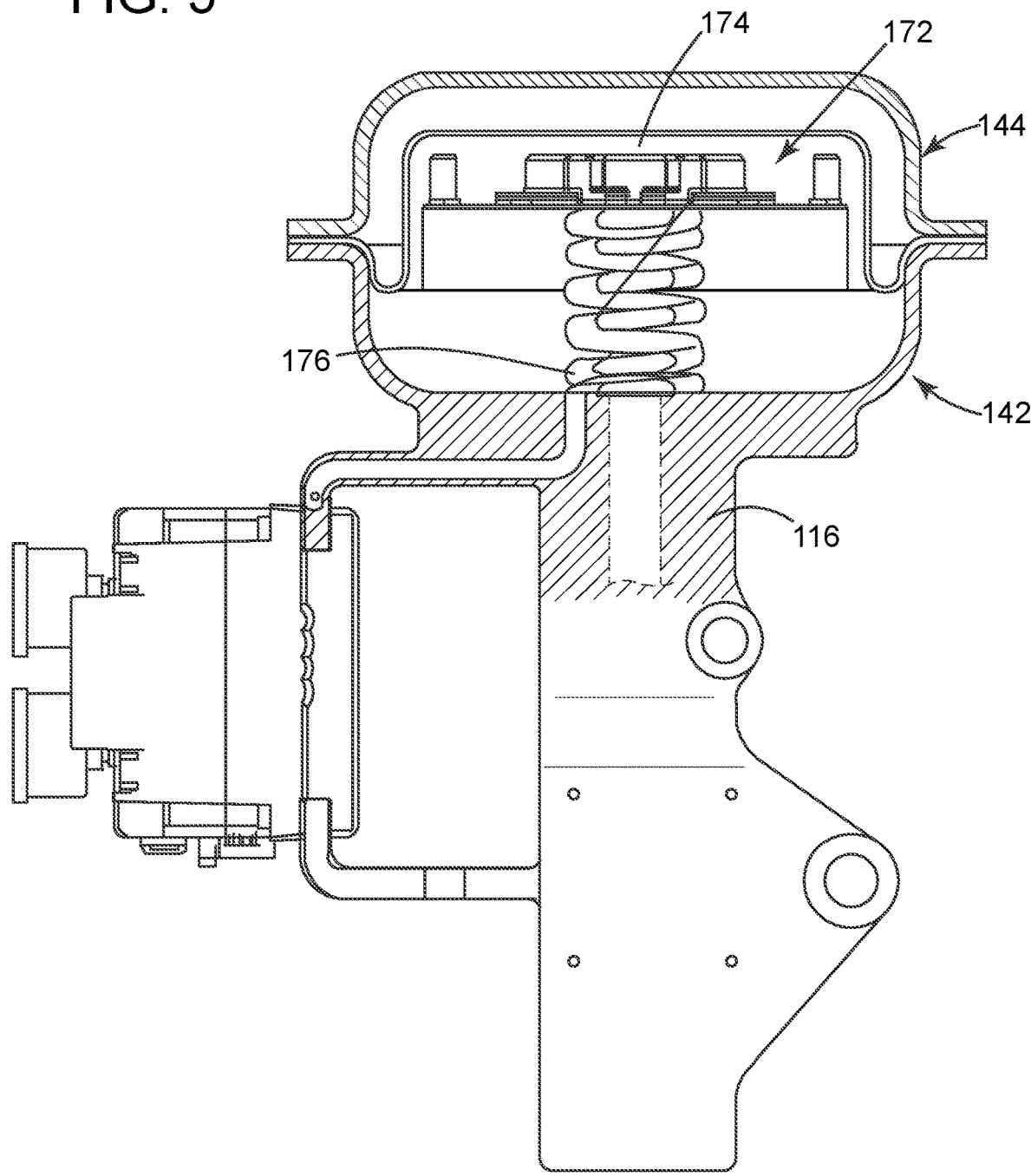
FIG. 5 depicts an elevation view of the cross-section from the side of the flow control of FIG. 4.

FIG. 5 provides an elevation view of the cross-section of the example of FIG. 4. The sealed enclosure may house the piston assembly 120 discussed above. The piston assembly 120 may include a piston 172. The valve stem 116 may attach to the piston 172, for example, using a threaded end and nut arrangement 174. The device may also include one or more springs 176. Deflection of the springs 176 may generate a spring load that, together with internal pressure due to the actuator control signal $S_2$, regulates position of the closure member 114 relative to the seat 112.

In view of the foregoing, the integral flow passage(s) in the yoke may benefit the design. These features can carry pressurized air that would normally require external conduit. The result is a more compact assembly with a smaller design envelope. This assembly may alleviate some fit issues that can arise onsite as part of facility construction. These issues may prevent use of certain devices or, in some cases, costly redesign or refit.

The examples below include certain elements or clauses one or more of which may be combined with other elements and clauses to describe embodiments contemplated within the scope and spirit of this disclosure. The scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A flow control, comprising:
a yoke comprising a first end and a second end, the yoke having arms that extend outwardly and terminate at a mount, the mount comprising a flat, interface plate with mounting holes and a port that provides access to a bore that extends from the port to an outlet at the second end, the bore forming a non-linear passage through material of the yoke that changes direction in at least two locations between the inlet and the outlet; and
a controller secured to the mount at the mounting holes, wherein the controller is configured to deliver a pressurized signal into the port.

2. The flow control of claim 1, wherein the bore has a contiguous inner surface.

3. The flow control of claim 1, wherein the pressurized signal exhausts from the outlet.

4. The flow control of claim 1, further comprising:
an actuator secured to the second end, wherein the pressurized signal exhausts from the outlet into the actuator.

5. The flow control of claim 1, further comprising:
an actuator disposed on the second end of the yoke,
wherein at least part of the actuator is formed integrally with the yoke.

6. The flow control of claim 1, further comprising:
an actuator disposed on the second end of the yoke,
wherein the actuator comprises a bowl-like member that is formed integrally with the yoke.

7. The flow control of claim 1, further comprising:
a sealed enclosure disposed on the second end, the sealed enclosure comprising a pair of separable members, at least one of which is formed integrally with the yoke,
wherein the pressurized signal from the controller exhausts from the outlet into the sealed enclosure.

8. The flow control of claim 1, further comprising:
a first casing formed integrally with the yoke at the second end, the first casing having a peripheral wall that circumscribes the outlet.

9. The flow control of claim 1, further comprising:
a first casing formed integrally with the yoke at the second end, the first casing having a peripheral wall that circumscribes the outlet; and
a second casing coupled with the first casing to form a sealed enclosure.

10. The flow control of claim 1, wherein the bore surface is formed integrally with material of the yoke.

11. A flow control, comprising:
a pneumatic actuator;
a controller coupled with the pneumatic actuator, the controller generating a pneumatic signal that pressurizes the pneumatic actuator; and
a superstructure that supports both the pneumatic actuator and the controller, the superstructure forming arms that extend outwardly and terminate at a mount, the mount comprising a flat, interface plate with mounting holes to receive fasteners that attach the controller to the superstructure and a port that provides access to a bore through which the pneumatic signal transits between the controller and the pneumatic actuator,
wherein the bore forms a non-linear passage through material of the superstructure that changes direction in at least two locations between the controller and the pneumatic actuator.

12. The flow control of claim 11, wherein the superstructure integrally forms part of the pneumatic actuator.

13. The flow control of claim 11, wherein the pneumatic actuator comprises a sealed enclosure, at least part of which is formed integrally with the superstructure.

14. The flow control of claim 11, further comprising a valve coupled with the superstructure and the pneumatic actuator.

15. The flow control of claim 11, wherein the bore forms a non-linear passage.

16. The flow control of claim 11, wherein the superstructure comprises a 3-D printed yoke.

17. The flow control of claim 11, wherein the bore surface is formed integrally with material of the superstructure.

18. An apparatus, comprising:
a valve with a moveable closure member;
an actuator coupled with the moveable closure member;
a controller coupled to the actuator, the controller having operating hardware to convert an electrical signal into a pneumatic signal; and
a superstructure that directs the pneumatic signal from the controller into the actuator internally, the superstructure forming arms that extend outwardly and terminate at a mount, the mount comprising a flat, interface plate with mounting holes to receive fasteners that attach the controller to the superstructure and a port that provides access to a bore through which the pneumatic signal transits between the controller and the pneumatic actuator,
wherein the bore forms a non-linear passage through material of the superstructure that changes direction in at least two locations between the controller and the pneumatic actuator.

19. The apparatus of claim 18, wherein the pneumatic signal enters a bottom portion of the actuator.

20. The apparatus of claim 18, wherein the pneumatic signal enters a top portion of the actuator.

* * * * *